US011251869B2

(12) United States Patent
Subbiah et al.

(10) Patent No.: US 11,251,869 B2
(45) Date of Patent: Feb. 15, 2022

(54) FIBRE CHANNEL NETWORKING DEVICE ZONE MERGING SYSTEM

(71) Applicant: Dell Products L.P., Round Rock, TX (US)

(72) Inventors: Ramesh Kumar Subbiah, Chennai (IN); Vibin Varghese, Tamil Nadu (IN)

(73) Assignee: Dell Products L.P., Round Rock, TX (US)

(*) Notice: Subject to any disclaimer, the term of this patent is extended or adjusted under 35 U.S.C. 154(b) by 113 days.

(21) Appl. No.: 16/667,404

(22) Filed: Oct. 29, 2019

(65) Prior Publication Data

US 2021/0126709 A1   Apr. 29, 2021

(51) Int. Cl.
*H04B 10/25* (2013.01)
*H04L 29/12* (2006.01)
*H04L 12/66* (2006.01)
*H04L 29/08* (2006.01)

(52) U.S. Cl.
CPC ... *H04B 10/25891* (2020.05); *H04B 10/2589* (2020.05); *H04L 12/66* (2013.01); *H04L 61/1535* (2013.01); *H04L 67/1097* (2013.01)

(58) Field of Classification Search
CPC .......... H04B 10/25891; H04B 10/2589; H04L 67/1097; H04L 61/1535; H04L 12/66; H04L 29/12886; H04L 49/357; H04L 61/6045
See application file for complete search history.

(56) References Cited

U.S. PATENT DOCUMENTS

| | | | | |
|---|---|---|---|---|
| 8,948,176 B1* | 2/2015 | Desanti | ................... | H04L 45/44 370/392 |
| 9,942,144 B1* | 4/2018 | Ramalingam | ......... | H04L 45/745 |
| 2003/0233427 A1* | 12/2003 | Taguchi | ................. | H04L 41/12 709/220 |
| 2007/0266132 A1* | 11/2007 | Hariharan | ........... | H04L 61/2038 709/223 |
| 2012/0106957 A1* | 5/2012 | Willeke | .............. | H04L 61/6045 398/58 |
| 2012/0263187 A1* | 10/2012 | Belanger | ............. | H04L 49/1523 370/401 |
| 2013/0010638 A1* | 1/2013 | Sasso | ...................... | H04L 49/65 370/254 |
| 2013/0028135 A1* | 1/2013 | Berman | .............. | H04L 12/4625 370/254 |

(Continued)

*Primary Examiner* — Benjamin H Elliott, IV
(74) *Attorney, Agent, or Firm* — Joseph Mencher

(57) ABSTRACT

A zone merging system includes a first FC networking device that is associated with one or more first FC networking device zones and a second FC networking device that is associated with one or more second FC networking device zones, wherein each of the one or more first and second FC networking device zones identifies a plurality of zone member devices. The second FC networking device performs limited zone merging operations subsequent to establishing a link with the first FC networking device. The limited zone merging operations include merging, via the link with first FC networking device zones, each of the second FC networking device zones that identifies at least one zone member device that is not local to the second FC networking device, while not merging each of the second FC networking device zones that identify only zone members that are local to the second FC networking device.

20 Claims, 9 Drawing Sheets

(56) References Cited

U.S. PATENT DOCUMENTS

| | | | | |
|---|---|---|---|---|
| 2013/0117621 A1* | 5/2013 | Saraiya | ................ | H04L 49/70 714/748 |
| 2013/0336317 A1* | 12/2013 | Mithyantha | ............ | H04L 45/18 370/390 |
| 2016/0036728 A1* | 2/2016 | Duda | ................ | H04L 12/4641 370/357 |
| 2021/0126709 A1* | 4/2021 | Subbiah | ................ | H04L 12/66 |

* cited by examiner

FIBRE CHANNEL NETWORKING DEVICE ZONE MERGING SYSTEM

BACKGROUND

The present disclosure relates generally to information handling systems, and more particularly to merging zones in information handling systems that provide Fibre Channel (FC) communications.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are configured to provide a Fibre Channel (FC) Storage Area Network (SAN) for the storage of data. For example, FC switch device(s) may provide an FC fabric that couples storage devices providing a SAN to server devices utilizing the FC protocol. In such FC fabrics, each FC switch device may utilize FC zoning, which provides for the partitioning of the FC fabric into smaller subsets to restrict interference, add security, and simplify management, and operates to restrict zone members (e.g., target devices and initiator devices, particular ports of devices, etc.) included in a zone to communicating with other zone members included in that zone.

When FC switch devices included in two different FC fabrics are joined via a link (e.g., an Inter-Switch Link (ISL)) between the FC switch devices, zone merging operations may be performed during the initialization of the link. In conventional zone merging operations, an entire copy of a first active zone set provided for the first FC switch device will be merged with a second active zone set provided for the second FC switch device, and an entire copy of the second active zone set provided for the second FC switch device will be merged with the first active zone set provided for the first FC switch device. The zone merging operations discussed above may involve a relatively large number of zones, and thus can become a costly operation in a scaled environment that may take several minutes to complete. Furthermore, when a conflict between zones occurs, the conflict may cause the link initialization to fail, resulting in all data traffic provided on the associated link between the FC switch devices to be blocked. Further still, conventional zone merging operations only occur when a link between the FC switch devices is being established, or there is a change to the zones themselves.

Accordingly, it would be desirable to provide an FC zone merging system that addresses the issues discussed above.

SUMMARY

According to one embodiment, an Information Handling System (IHS) includes a communication system; a processing system coupled to the communication system; and a memory system that is coupled to the processing system and that includes instructions that, when executed by the processing system, cause the processing system to provide a zone merging engine that is configured to: perform limited zone merging operations subsequent to establishing a link between the communication system and a first FC networking device that include: merging, via the link with one or more first FC networking device zones associated with the first FC networking device, each of one or more second FC networking device zones associated with the communication system that identifies at least one zone member device that is not local to the communication system, while not merging each of the one or more second FC networking device zones that identify only zone members that are local to the communication system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
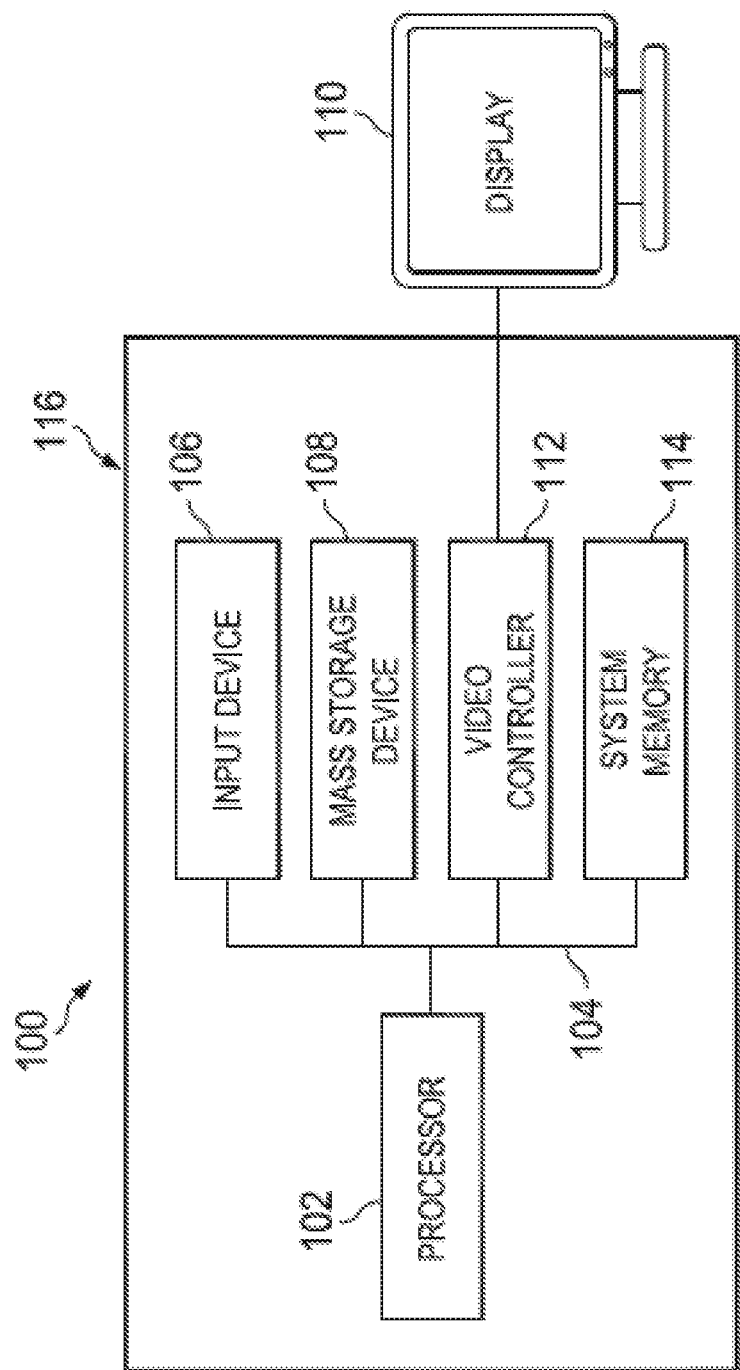
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
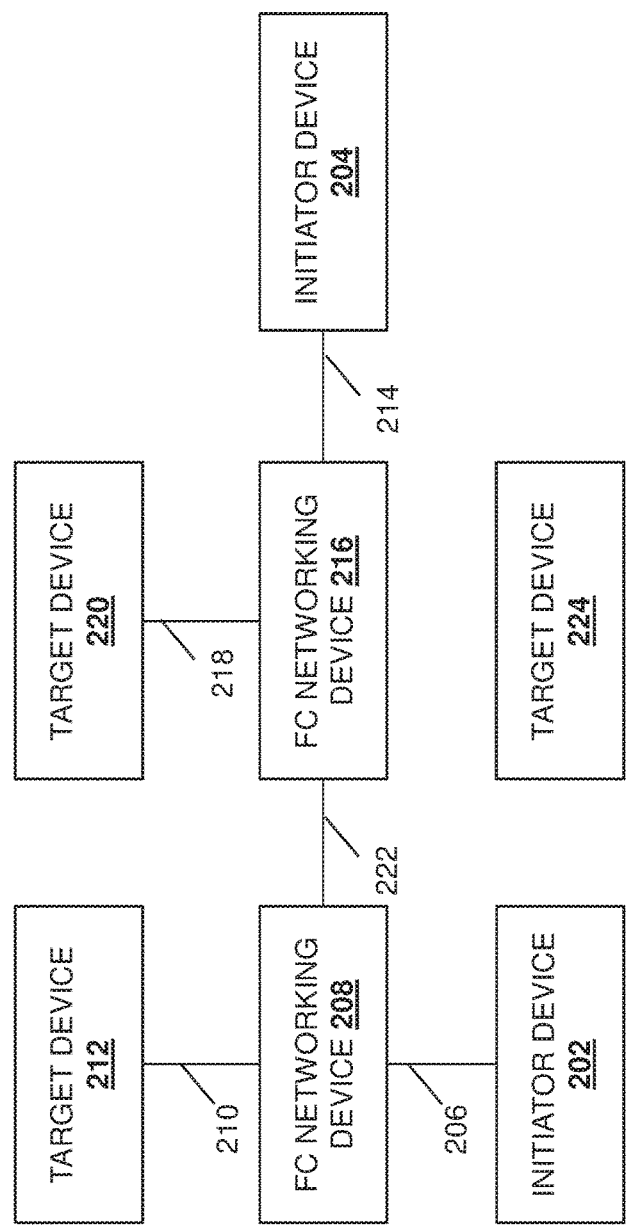
FIG. 2 is a schematic view illustrating an embodiment of a Fibre Channel (FC) zone merging system.

Referring now to FIG. 2, an embodiment of a Fibre Channel (FC) networking device zone merging system 200 is illustrated. In the illustrated embodiment, the FC networking device zone merging system 200 includes at least one initiator device such as, for example, the initiator device 202 and the initiator device 204 illustrated in FIG. 2. Either or both of the initiator devices 202 and 204 may be provided by the IHS 100 discussed above with reference to FIG. 1 and/or that may include some or all of the components of the IHS 100. For example, the initiator devices 202 and/or 204 may be provided by one or more server devices in a server rack or server chassis, and one of skill in the art in possession of the present disclosure will recognize that any number of initiator devices may be provided in the FC networking device zone merging system 200, and may operate similarly as the initiator devices 202 and 204 discussed below. In the illustrated embodiment, the initiator devices 202 is coupled by a link 206 to an FC networking device 208 that may be provided by the IHS 100 discussed above with reference to FIG. 1 and/or that may include some or all of the components of the IHS 100. For example, the FC networking device 208 may be provided by an FC switch device that is part of an FC fabric and that is configured to receive FC communications (e.g., initialed by the initiator device 202) directly from the initiator device 202, receive FC communications (e.g., initialed by the initiator device 202) from an intermediary Fiber Channel Forwarder (FCF) device (not illustrated) that couples the FC networking device 208 to the initiator device 202, log the initiator device 202 into the FC fabric, subsequently receive and transmit FC communications (e.g., initialed by the initiator device 202) from the initiator device 202 to allow the initiator device 202 to communicate with target devices included in the FC fabric (e.g., Storage Area Network (SAN) devices), and/or perform a variety of other FC networking device functionality that would be apparent to one of skill in the art in possession of the present disclosure.

In the illustrated embodiment, the FC networking device 208 is coupled by a link 210 to one of a plurality of endpoint devices such as, for example, a target device 212 that may be provided by the IHS 100 discussed above with reference to FIG. 1 and/or that may include some or all of the components of the IHS 100. For example, the target device 212 may be provided by an FC storage system that provides (or is part of) an FC SAN that is configured to receive FC communications from the initiator device 202 through the FC networking device 208, send FC communications to the initiator device 202 via the FC networking device 208, and/or perform a variety of other FC storage system functionality that would be apparent to one of skill in the art in possession of the present disclosure.

In the illustrated embodiment, the initiator devices 204 is coupled by a link 214 to an FC networking device 216 that may be provided by the IHS 100 discussed above with reference to FIG. 1 and/or that may include some or all of the components of the IHS 100. For example, the FC networking device 216 may be provided by an FC switch device that is part of an FC fabric and that is configured to receive FC communications (e.g., initialed by the initiator device 204) directly from the initiator device 204, receive FC communications (e.g., initialed by the initiator device 204) from an intermediary FCF device (not illustrated) that couples the FC networking device 216 to the initiator device 204, log the initiator device 204 into the FC fabric, subsequently receive and transmit FC communications (e.g., initialed by the initiator device 204) from the initiator device 204 to allow the initiator device 204 to communicate with target devices included in the FC fabric (e.g., SAN devices), and/or perform a variety of other FC networking device functionality that would be apparent to one of skill in the art in possession of the present disclosure.

In the illustrated embodiment, the FC networking device 216 is coupled by a link 218 to one of the plurality of endpoint devices such as, for example, a target device 220 that may be provided by the IHS 100 discussed above with reference to FIG. 1 and/or that may include some or all of the components of the IHS 100. For example, the target device 220 may be provided by an FC storage system that provides (or is part of) an FC SAN that is configured to receive FC communications from the initiator device 204 through the FC networking device 216, send FC communications to the initiator device 204 via the FC networking device 216, and/or perform a variety of other FC storage system functionality that would be apparent to one of skill in the art in possession of the present disclosure.

In an embodiment, the FC networking device 208 and the FC networking device 216 may be connected via ports (e.g., Expansion Ports (E_ports)) that provide a link 222 between the FC networking device 208 and the FC networking device 216 (e.g., an Inter-Switch Link (ISL) provided by respective inter-switch ports on FC switch devices). As discussed above, in conventional FC networks, the provisioning of an ISL between FC switch devices may result in the performance of conventional zone merging operations during E_port initialization. In some embodiments, the FC networking device zone merging system 200 may include a device such as, for example, the target device 224 illustrated in FIG. 2, that may be provided by the IHS 100 discussed above with reference to FIG. 1 and/or that may include some or all of the components of the IHS 100. As discussed in further detail below, in some embodiments the target device 224 may be provided such that it is not logged in to and/or connected via a link to any of the FC networking devices 208 and/or 216. However, while a specific FC networking device zone merging system 200 is illustrated and described below, one of skill in the art in possession of the present disclosure will recognize that the teachings of the present disclosure will be beneficial for a variety of FC systems that would be apparent to one of skill in the art in possession of the present disclosure and, as such, a wide variety of modifications to the number, types, and configuration of devices in the FC networking device zone merging system 200 will fall within the scope of the present disclosure as well.

Figure 3:
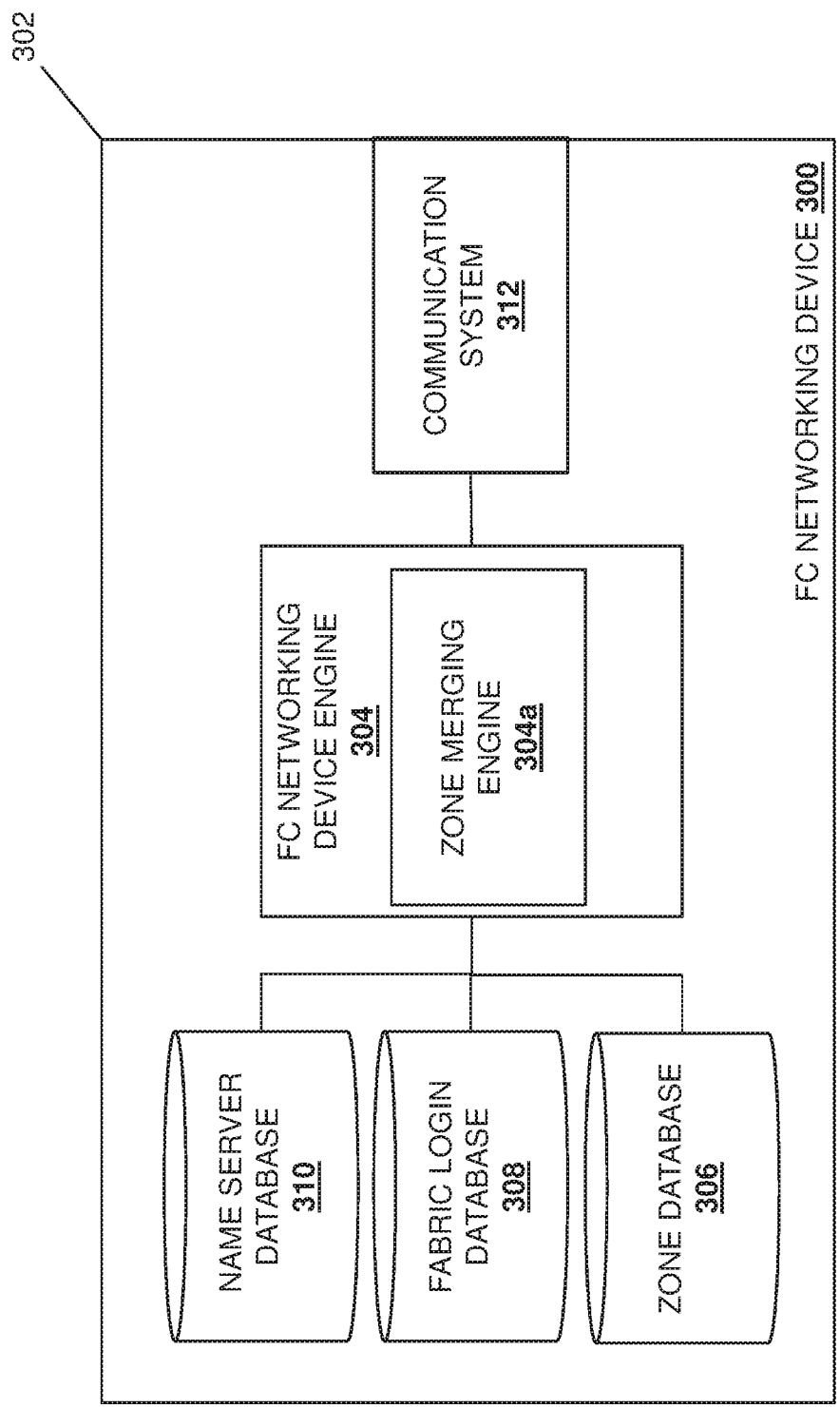
FIG. 3 is a schematic view illustrating an embodiment of an FC networking device that may be provided in the FC zone merging system of FIG. 2.

Referring now to FIG. 3, an embodiment of a Fibre Channel (FC) networking device 300 is illustrated that may be either or both of the FC networking devices 208 and/or 216 discussed above with reference to FIG. 2. As such, the FC networking device 300 may be provided by the IHS 100 discussed above with reference to FIG. 1 and/or may include some or all of the components of the IHS 100, and in specific examples may be provided by an FC switch device. In the illustrated embodiment, the FC networking device 300 includes a chassis 302 that houses the components of the FC networking device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an FC networking device engine 304 that is configured to perform the functions of the FC networking device engines and FC networking devices discussed below. Specifically, the FC networking device engine 304 may include a zone merging engine 304*a* that performs the zone merging operations of the zone merging engines and FC networking devices discussed below.

The chassis 302 may also house a storage system (not illustrated, but which may include the storage device 108 discussed above with reference to FIG. 1) that is coupled to the FC networking device engine 304 (e.g., via a coupling between the storage system and the processing system) and that may include a zone database 306 that is configured to store the zoning data utilized as discussed below. Furthermore, the storage system may also include a fabric login database 308 that is configured to store information about endpoint devices that are logged in to an FC fabric via the FC networking device 300. Further still, the storage system may also include a name server database 310 that is configured to store information about all endpoint devices that are logged in to an FC fabric. The chassis 302 may also house a communication subsystem 312 that is coupled to the FC networking device engine 304 (e.g., via a coupling between the communication subsystem 312 and the processing system) and that may include a Network Interface Controller (NIC), a wireless communication devices, ports, and/or other communication components that would be apparent to one of skill in the art in possession of the present disclosure. While a specific FC networking device 300 has been described, one of skill in the art in possession of the present disclosure will recognize that the FC networking device 300 may include a variety of other components that perform conventional FC networking device functionality, as well as the functionality described below, while remaining within the scope of the present disclosure.

Figure 4:
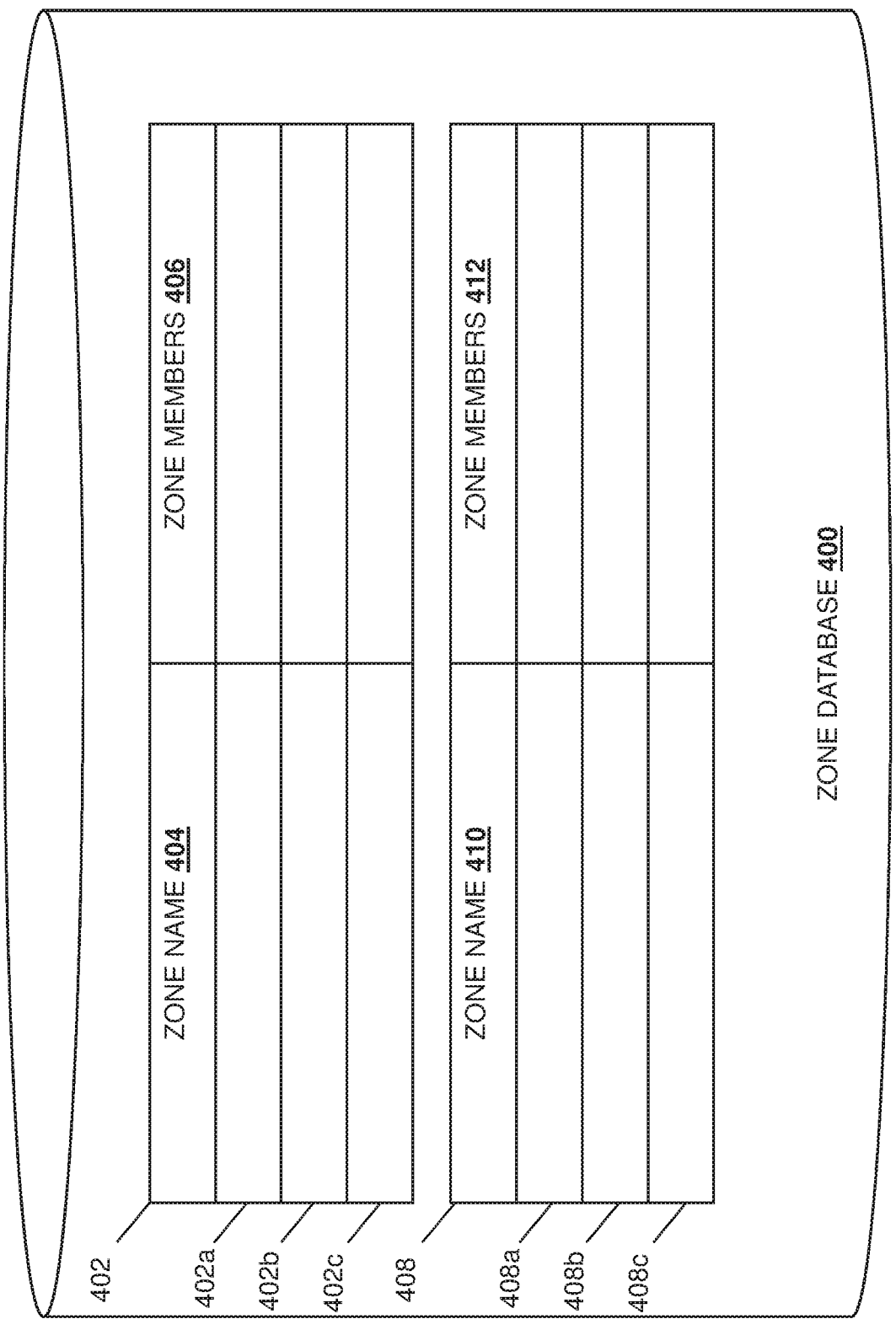
FIG. 4 is a schematic view illustrating an embodiment of a zone database that may be provided in the FC networking device of FIG. 3.

Referring now to FIG. 4, an embodiment of a zone database 400 is illustrated that may be the zone database 306 discussed above with reference to FIG. 3. In the illustrated example, the zone database 400 includes an FC networking device configured zone table 402 having FC networking device configured zone table entries or rows 402*a*, 402*b*, and up to 402*c*. In the illustrated example, for each FC networking device configured zone table entry 402*a*-402*c*, the FC networking device configured zone table 402 may include a zone name column 404, a zone member column 406, and/or other information columns that would be apparent to one of skill in the art in possession of the present disclosure. As discussed below, the FC networking device configured zone table 402 may provide mappings of a zone and its zone members such as, for example, initiator device identifiers (e.g., WWNs and, in some cases, FCIDs) that are mapped with that zone, and target device identifiers that are mapped with that zone. In an embodiment, the FC networking device configured zone table 402 may be configured on the FC networking device on which the zone database 400 resides, and one of skill in the art in possession of the present disclosure will appreciate that the FC networking device configured zone table 402 may provide a zone set that includes zones that indicate to that FC networking device which endpoint devices in the FC fabric can communicate with each another.

In the illustrated example, the zone database 400 includes an FC networking device merge zoning table 408 having FC networking device merge zoning table entries or rows 408*a*, 408*b*, and up to 408*c*, In the illustrated example, for each FC networking device merge zone table entry 408*a*-408*c*, the FC networking device merge zoning table 408 may include a zone name column 410, a zone member column 412, and/or other information columns that would be apparent to one of skill in the art in possession of the present disclosure. As discussed below, the FC networking device merge zoning table 408 may provide mappings of a zone and its zone members such as, for example, initiator device identifiers (e.g., WWNs and, in some cases, FCIDs) that are mapped with that zone, and target device identifiers that are mapped with that zone. As discussed below, the FC networking device merge zoning table 408 may include zones and zone members that are provided by other FC networking devices during a zone merging operation, and one of skill in the art in possession of the present disclosure will appreciate that the FC networking device merge zoning table 408 may provide a zone set that includes zones that indicate to the FC networking device which endpoint devices in the FC fabric can communicate with each other. Furthermore, in the examples below, the configured zoning information from a running configuration of the FC networking device configured zone table 402, plus the zoning information learned from a zone merging operation in the FC networking device merge zoning table 408, provides an active zone set. However, while a specific example of the zone database 400 is illustrated, one of skill in the art in possession of the present disclosure will recognize that the zone database 400, the FC networking device configured zone table 402, and/or the FC networking device merge zoning table 408 may include and/or store other information to enable the functionality discussed below while remaining within the scope of the present disclosure.

Figure 5:
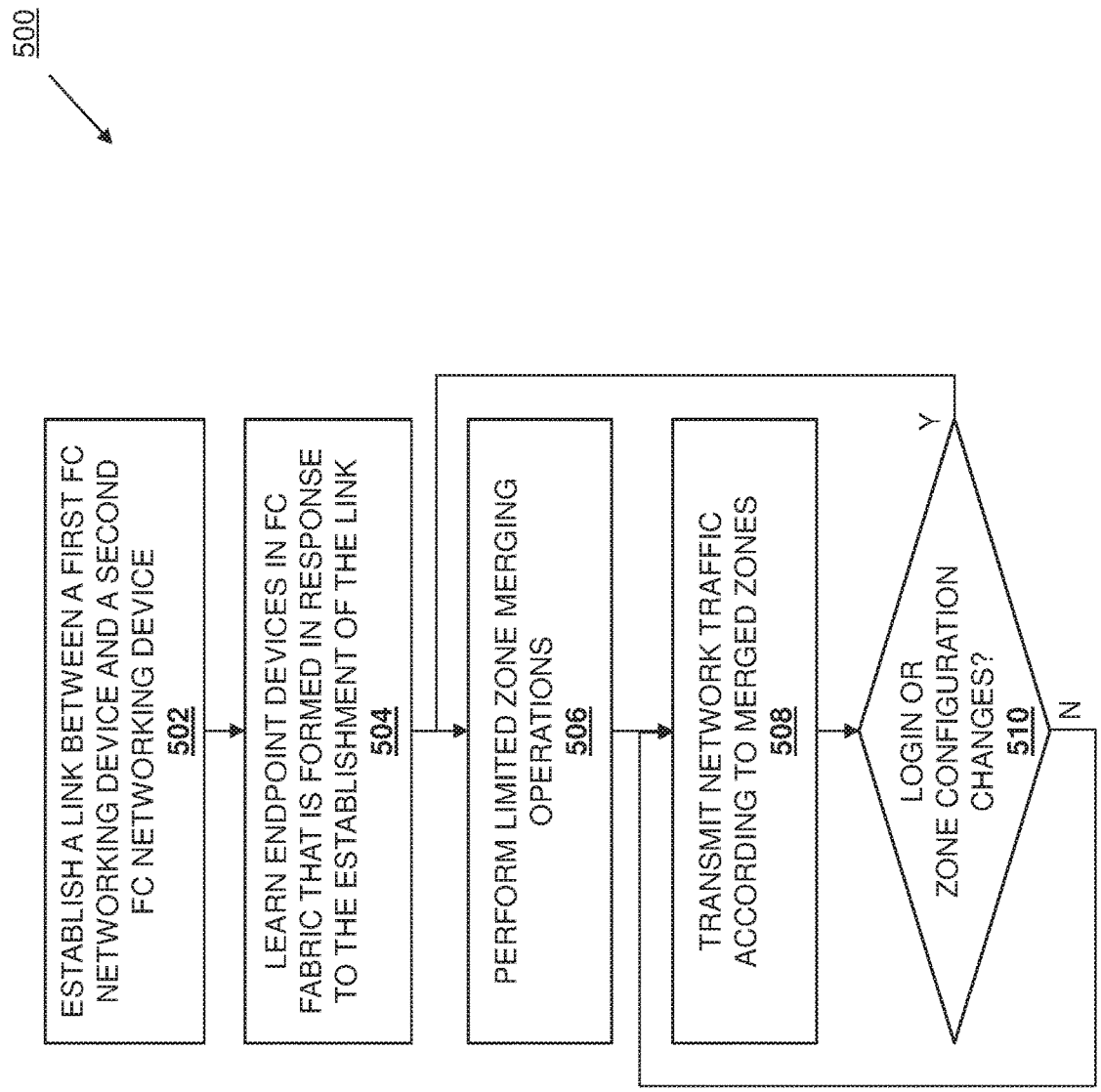
FIG. 5 is a flow chart illustrating an embodiment of a method for merging FC zones.

Referring now to FIG. 5, an embodiment of a method 500 for merging zones in FC networking devices is illustrated. As discussed above, when two or more FC fabrics are combined by establishing a link between respective FC networking devices in those separate FC fabrics (e.g., an ISL between E_ports on FC switch devices), zone merging operations are performed during initialization of the ports on the FC networking devices that establish the link. In conventional FC zone merging systems, the entire zone database of each FC networking device is provided, via the link, to the other FC networking device and, as such, during zone merging operations that include a relatively large number of zones, the zone merging operations are costly and take several minutes to complete. In contrast, the systems and methods of the present disclosure provide for the performance of limited zone merging operations by an FC networking device that only operates to merge zones that include non-local zone members (e.g., endpoint device(s) that are logged in to another FC networking device, and not the FC networking device that is performing the zone merging operations).

As such, zones that only include local zone members (e.g., endpoint device(s) that are logged in to the FC networking device that is performing the zone merging operations) and/or zones that do not include non-local zone members (e.g., endpoint device(s) that are not logged in to any FC networking devices in the FC fabric(s)) may not be merged with the other FC networking device during the zone merging operations. As will be appreciated by one of skill in the art in possession of the present disclosure, the merging of such zones is not required, as the other FC networking device does not need to be aware of such zones because their associated FC data traffic is only handled by the FC networking device on which those zones are configured. Thus, zone merging operations may be performed outside of the E_port initialization in which conventional zone merging operations are performed, and the limited zone merging operations of the present disclosure may be performed after name server exchanges and updates. Furthermore, the limited zone merging operations of the present disclosure do not require the merging of all zone members from each FC networking device, which decreases the amount of time need for performing zone merging operations. Further still, the systems and methods of the present disclosure allow an FC networking device that detects a conflict between two zones during a zone merging operation to mark the conflicted zones, but still propagate the zone that conflicts with its local zone to other FC networking devices such that only the network data traffic associated with the conflicted zone is affected by the zone conflict.

The method 500 begins at block 502 where a link is established between a first FC networking device and a second FC networking device. In embodiment, at block 502 and with reference to the FC networking device zone merging system 200 of FIG. 2, the FC networking device engine 304 in the FC networking device 208 may establish the link 222 (e.g., an ISL) with the FC networking device 216. For example, the link 222 may be established between an E_port included on the FC networking device 208 and an E_port included on the FC networking device 216. As will be appreciated by one of skill in the art in possession of the present disclosure, the establishment of the link 222 may be performed during E_port initialization operations, and those E_port initialization operations may be modified from conventional E_port initialization operations in that, in at least some embodiments of the present disclosure, zone merging operations are not performed during the E_port initialization operations.

Furthermore, prior to the establishment of the link 222 between the FC networking device 208 and the FC networking device 216, at least one of the FC networking devices 208 and/or 216 may be configured with an active zone set. For example, and with reference to FIG. 6, the FC networking device 208 may be configured with an FC networking device configured zone table 602 in a zone database 600 that may be substantially similar to the zone database 306/400 discussed above with reference to FIGS. 3 and 4. As illustrated, the FC networking device configured zone table 602 may include the FC networking device configured zone table entries 602a, 602b, and up to 602c. As illustrated, the FC networking device configured zone table entry 602a may include a zone in the zone name column 604 that is identified by "FC_networking_device_208_zone1" and may include zone members in the zone member column 606 that have identifiers "initiator_device_202" identifying the initiator device 202 and target_device_212" identifying the target device 212. Similarly, the FC networking device configured zone table entry 602b may include a zone in the zone name column 604 that is identified by "FC_networking_device_208_zone2", and may include zone members in the zone member column 606 that have identifiers Initiator_device_202" identifying the initiator device 202 and "target_device_220" identifying the target device 220. Similarly as well, the FC networking device configured zone table entry 602c may include a zone in the zone name column 604 that is identified by "FC_networking_device_208_zone3", and may include zone members in the zone member column 606 that have identifiers "initiator_device_202" identifying the initiator device 202 and "target_device_224" identifying the target device 224. In some specific examples, the identifiers for the zone members in a zone identified in the zone member column 606 may include a WWN of the endpoint devices that are configured for that zone.

In some embodiments, the FC networking device 216 may have also been configured with an active zone set prior to the establishment of the link 222. For example, with reference to FIG. 7, the FC networking device 216 may be configured with the FC networking device configured zone table 702 in a zone database 700 that may be substantially similar to the zone database 306/400 discussed above with reference to FIGS. 3 and 4. As illustrated, the FC networking device configured zone table 702 may include the FC networking device configured zone table entries 702a, 702b, and up to 702c, Similarly, the FC networking device configured zone table entry 702a may include a zone in the zone name column 704 that is identified by "FC_networking_device_216_zone1", and may include zone members in the zone member column 606 that have identifiers "initiator_device_204" identifying the initiator device 204 and "target_device_220" identifying the target device 220. Similarly, the FC networking device configured zone table entry 602b may include a zone in the zone name column 604 that is identified by "FC_networking_device_216_zone2", and may include zone members in the zone member column 606 that have identifiers "initiator_device_204" identifying the initiator device 204 and target_device_212" identifying the target device 212. In some specific examples, the identifiers for the zone members in a zone identified in the zone member column 606 may include a WWN of the endpoint devices that are configured for that zone.

The method 500 may then proceed to block 504 where the first FC networking device learns the devices in an FC fabric that is established in response to the establishment of the link between the first FC networking device and the second FC networking device. In an embodiment, at block 504, the FC networking device engine 304 in the FC networking device 208 may learn the devices in the FC fabric that is formed as a result of establishing the link 222 between the FC networking device 208 and the FC networking device 216. For example, the FC networking device 208 may perform name server exchanges involving the name server database 310 in the FC networking device 208 and the name server database 310 in the FC networking device 216 and, as would be appreciated by one of skill in the art in possession of the present disclosure, such name server exchanges operate to update the name server database 310 in the FC networking device 208 with name server information that is included in the name server database 310 on the FC networking device 216 while updating the name server database 310 in the FC networking device 208 with name server information that is included in the name server database 310 in the FC networking device 216. In some embodiments, the FC networking devices 208 and 216 may learn each other's name server database 310 via the link 222 and, as would be appreciated by one of skill in the art in possession of the present disclosure, each name server database entry may include a VSAN identifier, an FCID, a type, a port identifier (e.g., a PortName), an endpoint device identifier (e.g., a NodeName), a type/feature (e.g., a FC4 Type/Feature), a device alias, a fabric port name and/or any other information that would be apparent to one of skill in the art.

The method 500 may then proceed to block 506 where the first FC networking device and the second FC networking device perform limited zone merging operations. In an embodiment, at block 506, the zone merging engine 304a in the FC networking device 208 may operate to perform limited zone merging operations by identifying one or more zones for merging with the networking device 216 via the link 222 to the FC networking device 216, with the identified zones including at least one "non-local" zone member that is not local to the FC networking device 208. Furthermore, the zone merging engine 304a in the FC networking device 208 may also prevent zones that include only "local" zone members that are local to the FC networking device 208 from being identified to the FC networking device 216, which prevents those zones from being merged with the zones on the FC networking device 216. Further still, the zone merging engine 304a in the FC networking device 208 may also prevent zones that include only zone members that are not logged in to an FC networking device from being identified to the FC networking device 216 such that those zones are not merged with the zones on the FC networking device 216. Further still, the zone merging engine 304a in the FC networking device 208 may also prevent zones that only have 1) zone members that are not logged in to an FC networking device, and 2) "local" zone members that are local to the FC networking device 208, from being identified to the FC networking device 216 such that those zones are not merged with the zones on the FC networking device 216.

Similarly, the zone merging engine 304a in the FC networking device 216 may operate to perform limited zone merging operations by identifying one or more zones for merging with the networking device 208 via the link 222 to the FC networking device 208, with the identified zones including at least one "non-local" zone member that is not local to the FC networking device 216. Furthermore, the zone merging engine 304a in the FC networking device 216 may also prevent zones that include only "local" zone members that are local to the FC networking device 216 from being identified to the FC networking device 208, which prevents those zones from being merged with the zones on the FC networking device 208. Further still, the zone merging engine 304a in the FC networking device 216 may also prevent zones that include only zone members that are not logged in to a FC networking device from being identified to the FC networking device 208 such that those zones are not merged with the zones on the FC networking device 208. Further still, the zone merging engine 304a in the FC networking device 216 may also prevent zones that only have 1) zone members that are not logged in to an FC networking device, and 2) zone members that are local to the FC networking device 216, from being identified to the FC networking device 208 such that those zones are not merged with the zones on the FC networking device 208.

In various embodiments, a zone member may be local to an FC networking device if that zone member is logged in to that FC networking device. As such, in order to determine whether zone members are logged in to the FC networking device 208, the zone merging engine 304a in the FC networking device 208 may reference the fabric login database 308 in the FC networking device 208. For example, the fabric login (FLOGI) database 308 may include a FLOGI table that includes one or more FLOGI entries that identify the endpoint devices that are logged in to the FC networking device 208, and each FLOGI entry may include an interface identifier, a VSAN identifier, an FCID, a port name identifier, a node name identifier, and/or any other FLOGI database information that would be apparent to one of skill in the art in possession of the present disclosure. In an embodiment, the zone merging engine 304a in the FC networking device 208 may use the fabric login database 308 to determine which zone members of the zones in the zone database 600 are local to the FC networking device 208 by comparing zone member identifiers (e.g., FCID, a port name identifier, a node name identifier, etc.) with a corresponding FLOGI table identifier for a particular logged in endpoint device.

Figure 6:
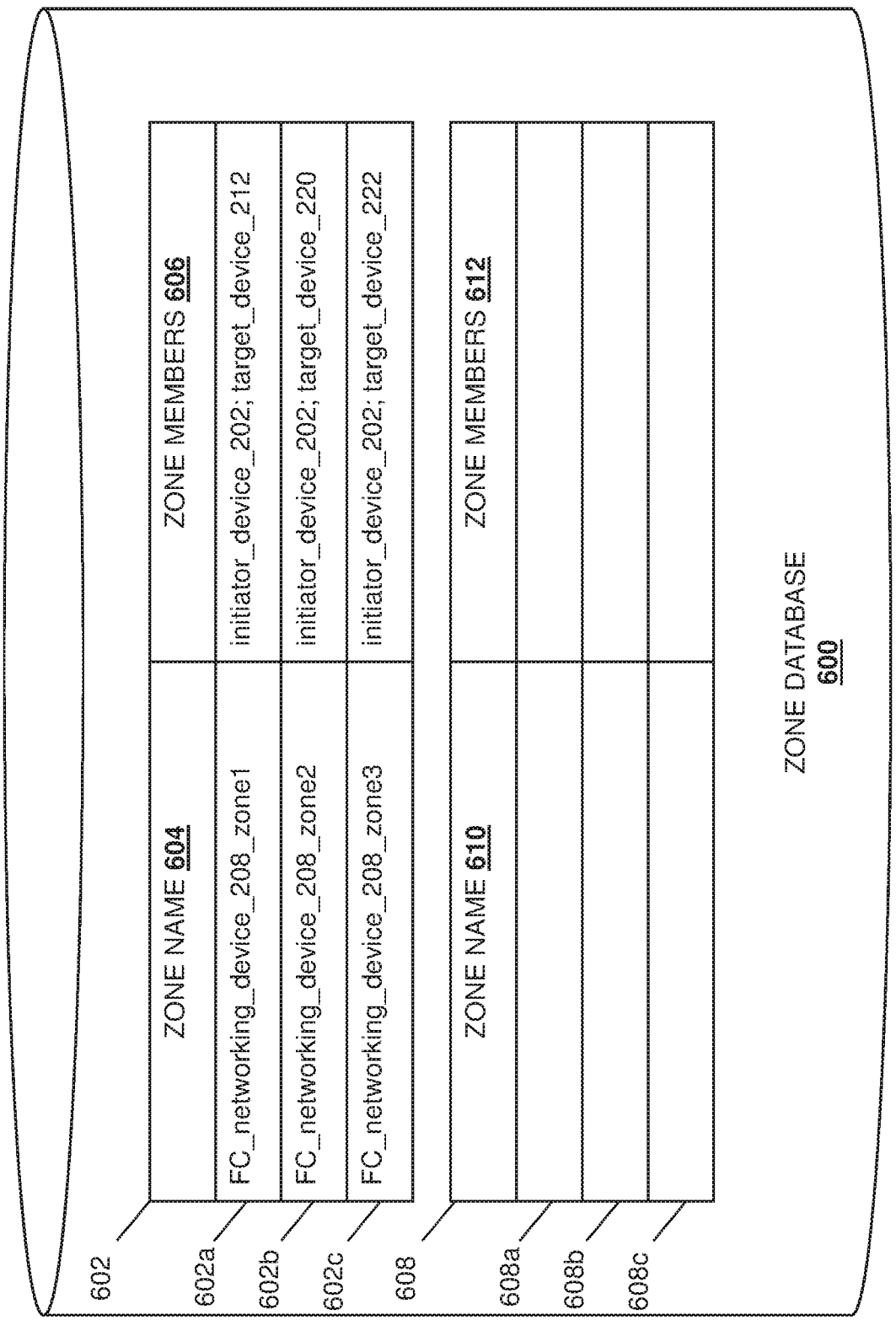
FIG. 6 is a schematic view illustrating an embodiment of information being provided in the zoning database of FIG. 4 during the method of FIG. 5.

Continuing with the examples provided above, the initiator device 202 identified by the "initiator_device_202" identifier in the FC networking device configured zone table entries 602a, 602b, and 602c included in the FC networking device configured zone table 602 in FIG. 6 may match an identifier for the initiator device 202 in the fabric login database 308, and thus the zone merging engine 304a in the FC networking device 208 may determine that the initiator device 202 identified by the "initiator_device_202" identifier in the FC networking device configured zone table entries 602a-602c is local to the FC networking device 208. Similarly, the target device 212 identified by the "target_device_212" identifier in the FC networking device configured zone table entry 602a included in the FC networking device configured zone table 602 in FIG. 6 may match an identifier for the target device 212 in the fabric login database 308, and thus the zone merging engine 304a in the FC networking device 208 may determine that the target device 212 identified by the "target_device_212" identifier in the FC networking device configured zone table entry 602a is local to the FC networking device 208.

In other embodiments, the zone merging engine 304a in the FC networking device 208 may reference the name server database 310 in the FC networking device 208 in order to determine whether zone members are local to the FC networking device 208. For example, the name server database 310 may include a local name server database of the port logins (PLOGIs) performed at the FC networking device 208, and the zone merging engine 304a in the FC networking device 208 may compare the identifiers (e.g., WWNs) of the zone members in the zone database 600 to the identifiers (e.g., WWNs) in the local name server database to discover zone members that are local to the FC networking device 208.

In some embodiments, the zone merging engine 304a in the FC networking device 208 may also use the name server database 310 to determine the zone members in the zones 602a-602c that are not local and that are logged in to the FC fabric. For example, the zone merging engine 304a in the FC networking device 208 may reference name server entries that were added to the name server database 310 during name server exchanges via the link 222, and compare identifiers associated with those name server entries with the identifiers of the zone members in the zone database 600. In other examples, the zone merging engine 304a may determine the zone members in the zones 602a-602c that are not local by checking a domain ID in the FC-ID of endpoint devices. In another example, the zone merging engine 304a may determine the zone members in the zones 602a-602c that are not local by correlating the FLOGI database with the name server entries. As will be appreciated by one of skill in the art in possession of the present disclosure, a "non-local" zone member may not be local to an FC networking device when that zone member is logged in to another FC networking device besides that FC networking device. In some examples, the zone merging engine 304a in the FC networking device 208 may use the name server database 310 to determine which zone members are not local to the FC networking device 208. For example, the target device 220 identified by the "target_device_220" identifier in the FC networking device configured zone table entry 602b included in the FC networking device configured zone table 602 in FIG. 6 may match an identifier for the target device 220 in the name server database 310, and the name server database 310 may indicate that the target device 220 is logged in to the FC networking device 216, which allows the zone merging engine 304a in the FC networking device 208 to determine that the target device 220 identified by the "target_device_220" identifier in the FC networking device configured zone table entry 602b included in the FC networking device configured zone table 602 in FIG. 6 is not local to the FC networking device 208.

In various embodiments, the zone merging engine 304a in the FC networking device 208 may also use the name server database 310 to determine the zone members in the zones 602a-602c that are not logged in to the FC fabric via any FC switch. For example, the zone merging engine 304a in the FC networking device 208 may use the name server database 310 to determine which zone members in the zone database 600 are not logged in to the FC networking device 208 or the FC networking device 216. For example, the target device 224 identified by the "target_device_224" identifier in the FC networking device configured zone table entry 602c included in the FC networking device configured zone table 602 in FIG. 6 may not match any identifier in the name server database 310, and thus the zone merging engine 304a in the FC networking device 208 may determine the target device 224 identified by the "target_device_224" identifier in the FC networking device configured zone table entry 602c included in the FC networking device configured zone table 602 in FIG. 6 is not logged in to the FC fabric.

In an embodiment, from the perspective of the FC networking device 216, the zone merging engine 304a in the FC networking device 216 may reference the fabric login database 308 in the FC networking device 216 to determine whether zone members are logged in to the FC networking device 216. For example, the fabric login database 308 may include a FLOGI table that includes one or more FLOGI entries that indicate the endpoint devices that are logged in to the FC networking device 216, with each FLOGI entry including an interface identifier, a VSAN identifier, an FCID, a port name identifier, a node name identifier, and/or any other FLOGI database information that would be apparent to one of skill in the art in possession of the present disclosure. As such, the zone merging engine 304a in the FC networking device 216 may use the fabric login database 308 to determine which zone members of the zones in the zone database 700 are local to the FC networking device 216.

Figure 7:
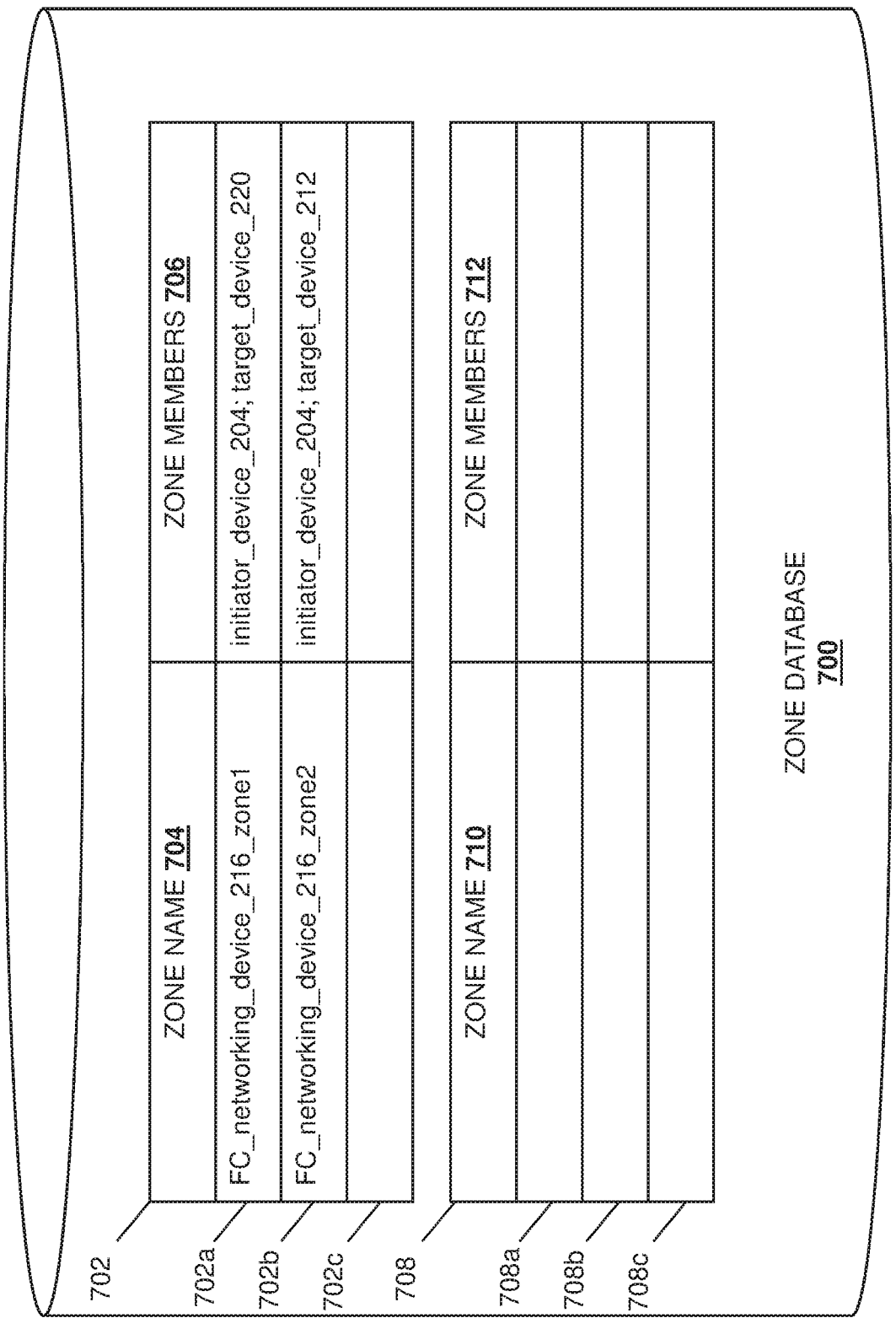
FIG. 7 is a schematic view illustrating an embodiment of information being provided in the zoning database of FIG. 4 during the method of FIG. 5.

For example, the initiator device 204 identified by the "initiator_device_204" identifier in the FC networking device configured zone table entries 702a and 702b included in the FC networking device configured zone table 702 in FIG. 7 may match an identifier for the initiator device 204 in the fabric login database 308, and thus the zone merging engine 304a in the FC networking device 216 may determine the initiator device 204 identified by the "initiator_device_204" identifier in the FC networking device configured zone table entries 702a and 702b included in the FC networking device configured zone table 702 in FIG. 7 is local to the FC networking device 216. Similarly, the target device 220 identified by the "target_device_220" identifier in the FC networking device configured zone table entry 702a included in the FC networking device configured zone table 702 in FIG. 7 may match an identifier for the target device 220 in the fabric login database 308, and thus the zone merging engine 304a in the FC networking device 216 may determine the target device 220 identified by the "target_device_220" identifier in the FC networking device configured zone table entry 702a included in the FC networking device configured zone table 702 in FIG. 7 is local to the FC networking device 216.

In some embodiments, the zone merging engine 304a in the FC networking device 216 may reference the name server database 310 in the FC networking device 216 to determine whether zone members are local to the FC networking device 216, with the name server database 310 including a local name server database of the port logins (PLOGIs) performed at the FC networking device 216. As such, the zone merging engine 304a in the FC networking device 216 may compare the identifiers of the zone members in the zone database 700 to the identifiers in the local name server database to discover zone members that are local to the FC networking device 216.

In an embodiment, the zone merging engine 304a in the FC networking device 216 may also use the name server database 310 to determine the zone members in the FC networking device configured zone table entries 702a and 702b included in the FC networking device configured zone table 702 in FIG. 7 that are not local and that are logged in to the FC fabric. For example, the zone merging engine 304a in the FC networking device 216 may reference name server entries that were added to the name server database 310 during name server exchanges via the link 222, and compare identifiers associated with those name server entries to the identifiers of the zone members in the zone database 600. As will be appreciated by one of skill in the art in possession of the present disclosure, a zone member may not be local to an FC networking device when that zone member is logged in to another FC networking device besides that FC networking device. In an embodiment, the zone merging engine 304a in the FC networking device 216 may use the name server database 310 to determine which zone members are not local to the FC networking device 216. For example, the target device 212 identified by the "target_device_212" identifier in the FC networking device configured zone table entry 702b included in the FC networking device configured zone table 702 in FIG. 7 may match an identifier for the target device 212 in the name server database 310, and the name server database 310 may indicate that the target device 212 is logged in to the FC networking device 208. Thus, the zone merging engine 304a in the FC networking device 216 may determine the target device 212 identified by the "target_device_212" identifier in the FC networking device configured zone table entry 702b included in the FC networking device configured zone table 702 in FIG. 7 is not local to the FC networking device 216.

In various embodiments, the zone merging engine 304a in the FC networking device 216 may also use the name server database 310 to determine the zone members in the FC networking device configured zone table entries 702a and 702b included in the FC networking device configured zone table 702 in FIG. 7 that are not logged in to the FC fabric via any FC networking device. In an embodiment, the zone merging engine 304a in the FC networking device 208 may use the name server database 310 to determine which zone members in the zone database 700 are not logged in to the FC networking device 208 or the FC networking device 216. With reference to FIG. 7, because none of the FC networking device configured zone table entries 702a and 702b identify the target device 224, and all other zone members of the zoning database 700 are either local or not local to the FC networking device 216, the zone merging engine 304a in the FC networking device 216 may determine that there are no zone members that are not logged in to the FC fabric.

After determining whether each zone member is a local zone member, a non-local zone member, or not logged in to the FC fabric, the zone merging engine 304a in the FC networking device 208 may transfer, via the link 222 to the FC networking device 216, zones that include at least one "non-local" zone member that is not local to the FC networking device 208, while preventing the transfer of zones that include only "local" zone members that are local to the FC networking device 208, preventing the transfer of zones that include only zone members that are not logged in to an FC networking device from being provided to the FC networking device 216, and/or preventing 1) the transfer of zones that only have zone members that are not logged in to an FC networking device and 2) zone members that are local to the FC networking device 208. Continuing with the example provided above, the zone "FC_networking_device_208_zone2" in the FC networking device configured zone table entry 602b included in the FC networking device configured zone table 602 in FIG. 6 identifies the target device 220 as a zone member that is not local to the FC networking device 208, which causes the zone merging engine 304a in the FC networking device 208 to then transfer that zone via the link 222 to the FC networking device 216. However, because the zone "FC_networking_device_208_zone1" in the FC networking device configured zone table entry 602a included in the FC networking device configured zone table 602 in FIG. 6 identifies the initiator device 202 and the target device 212 as zone members that are local to the FC networking device 208, that zone is not transferred to the FC networking device 216 during the limited zone merging operations. Likewise, because the zone "FC_networking_device_208_zone3" in the FC networking device configured zone table entry 602c included in the FC networking device configured zone table 602 in FIG. 6 identifies the initiator device 202 as a zone member that is local to the FC networking device 208, and the target device 224 as a zone member that is not logged in to the FC fabric, that zone is not transferred to the FC networking device 216 during the limited zone merging operations of block 506.

Similarly, and from the perspective of the FC networking device 216, after determining whether each zone member is a local zone member, a non-local zone member, or not logged in to the FC fabric, the zone merging engine 304a on the FC networking device 216 may transfer, via the link 222 to the FC networking device 208, zones that include at least one non-local zone member that is not local to the FC networking device 216, while preventing the transfer of zones that include only local zone members that are local to the FC networking device 216, preventing the transfer of zones that include only zone members that are not logged in to an FC networking device from being provided to the FC networking device 208, and/or preventing the transfer of zones that only have 1) zone members that are not logged in to an FC networking device and 2) zone members that are local to the FC networking device 216. For example, because the zone "FC_networking_device_216_zone2" in the FC networking device configured zone table entry 702b included in the FC networking device configured zone table 702 in FIG. 7 identifies the target device 212 as a zone member that is not local to the FC networking device 216, then that zone is transferred via the link 222 to the FC networking device 208. However, because the zone "FC_networking_device_216_zone1" in the FC networking device configured zone table entry 702a included in the FC networking device configured zone table 702 in FIG. 7 identifies the initiator device 204 and the target device 220 as zone members that are local to the FC networking device 216, then that zone is not transferred to the FC networking device 208 during the limited zone merging operations.

Figure 8A:
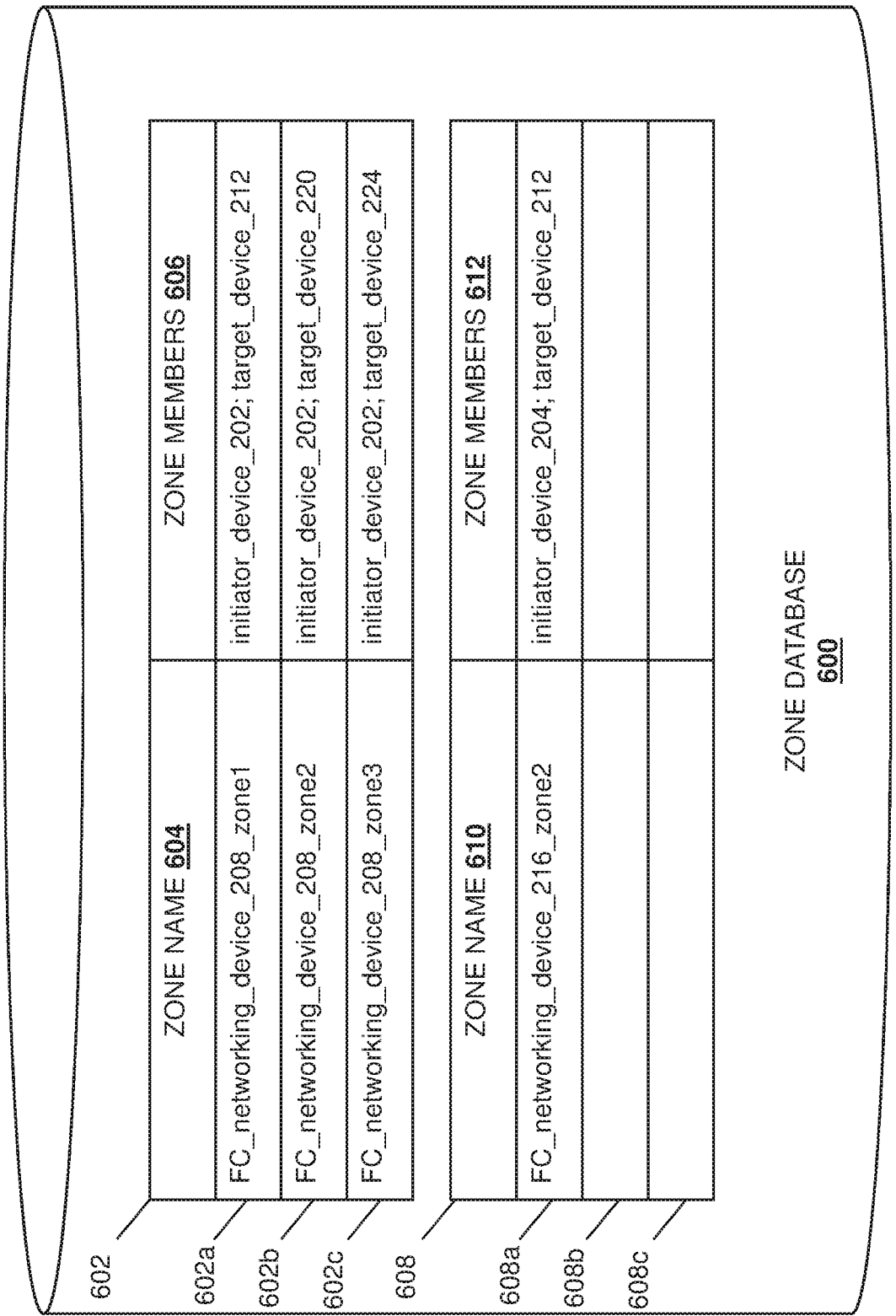
FIG. 8A is a schematic view illustrating an embodiment of information being provided in the zoning database of FIG. 4 during the method of FIG. 5.

When the FC networking device 208 receives a zone from the FC networking device 216 via the link 222 during the limited zone merging operations, the zone merging engine 304a in the FC networking device 208 may determine whether the zone results in any conflicts with the existing zones in its zoning database 600. If there are no conflicts, then the zone merging engine 304a in the FC networking device 208 may operate to merge that zone with the existing zones in its zone database 600, and/or otherwise update its zone database 600 with the zone received from the FC networking device 216. For example, the zone merging engine 304a on the FC networking device 208 may add any zone received from the FC networking device 216 to the FC networking device zone merging table 608. Referring to the specific example illustrated in FIG. 8A, the zone merging engine 304a on the FC networking device 208 may add the zone "FC_networking_device_216_zone2" in the zone name column 604 of the FC networking device zone merging table entry 608a in the FC networking device zone merging table 608 in the zone database 600, and add the zone member identifier "initiator_device_204" that identifies the initiator device 204 and the zone member identifier "target_device_212" that identifies the target device 212 in the zone member column 606 of the FC networking device zone merging table entry 608a. As would be appreciated by one of skill in the art in possession of the present disclosure, while illustrated as two separate tables, the FC networking device zone merging table 608 and the FC networking device configured zone table 602 may be combined. Furthermore, an active zone set may be created for the FC networking device 208 that includes the two tables and the zones "FC_networking_device_208_zone1," "FC_networking_device_208_zone2," "FC_networking_device_208_zone3," and "FC_networking_device_216_zone2."

Likewise, when the FC networking device 216 receives a zone from the FC networking device 208 via the link 222 during the limited zone merging operations, the zone merging engine 304a in the FC networking device 216 may determine whether that zone results in any conflicts with the existing zones in the zoning database 700. If there are no conflicts, then the zone merging engine 304a may operate to merge that zone with the existing zones in the zone database 700, and/or otherwise update the zone database 700 with the zone received from the FC networking device 208. For example, the zone merging engine 304a on the FC networking device 216 may add any zone received from the FC networking device 208 to the FC networking device zone merging table 708. Referring to a specific example illustrated in FIG. 8B, the zone merging engine 304a on the FC networking device 216 may add the zone "FC_networking_device_208_zone2" in the zone name column 704 of the FC networking device zone merging table entry 708a in the FC networking device zone merging table 708 in the zone database 700, and add the zone member identifier "initiator_device_202" that identifies the initiator device 202 and the zone member identifier "target_device_220" that identifies the target device 220 in the zone member column 706 of the FC networking device zone merging table entry 708a. As would be appreciated by one of skill in the art in possession of the present disclosure, while illustrated as two separate tables, the FC networking device zone merging table 708 and the FC networking device configured zone table 702 may be combined. Furthermore, an active zone set may be created for the FC networking device 216 from the merging of the zones that include the zones "FC_networking_device_216_zone1," "FC_networking_device_216_zone2," and "FC_networking_device_208_zone2."

If, during the limited zone merging operations, the zone merging engine 304a on the FC networking device 208 determines that there is a conflict with a zone received from the FC networking device 216, then the FC networking device 208 will forward that received zone to any other FC networking device to which the FC networking device 208 is connected (e.g., via an link such as, for example, a second ISL to another FC networking device), while not updating the zoning database 600 for the FC networking device 208 with that received zone, or updating the zoning database 600 but marking the update of that received zone as a conflicted zone. In such situations, the zone merging engine 304a in the FC networking device 208 may then provide an alert to an administrator about the conflict. For example, the zone merging engine 304a in the FC networking device 208 may send an email alert to an administrator, log a conflict in a log file, cause a display device and/or indicator (e.g., light emitting diode) on the FC networking device 208 to provide a visual indication about the conflict, and/or any other provide any other alert that would be apparent to one of skill in the art in possession of the present disclosure.

Similarly, if during the limited zone merging operations the zone merging engine 304a on the FC networking device 216 determines that there is a conflict with a zone received from the FC networking device 208, then the FC networking device 216 will forward that received zone to any other FC networking device to which the FC networking device 216 is connected (e.g., via a link such as, for example, an ISL to another FC networking device), while not updating the zoning database 700 for the FC networking device 216 with that received zone, or updating the zoning database 600 but marking the update of that received zone as a conflicted zone. In such situations, the zone merging engine 304a in the FC networking device 216 may then provide an alert to an administrator about the conflict. For example, the zone merging engine 304a in the FC networking device 216 may send an email alert to an administrator, log a conflict in a log file, cause a display device and/or indicator (e.g., light emitting diode) on the FC networking device 216 to provide a visual indication about the conflict, and/or provide any other alert that would be apparent to one of skill in the art in possession of the present disclosure.

In some embodiments, a conflict may arise when the received zone shares the same name as an existing zone and those zones have different zone members, different attributes, and/or due to any other conflict issues that would be apparent to one of skill in the art in possession of the present disclosure. In conventional zone merging operations, a conflict between zones that are being merged would result in the ISL not initializing due to, for example, the conflict causing an error in the E_port initialization operations. However, in the limited zone merging operations of the present disclosure, the limited zone merging operations are separated from the E_port initialization operations that initialize the link 222 and, as such, only the network traffic that corresponds to the conflicted zone on the FC networking device where the conflict exists may be impacted by such zone conflicts, while other network data traffic on that FC networking device controlled by other zones that are not conflicted may continue to be transmitted without issue. Both conflicting zones are affected and unless the conflict is rectified, the devices within those zones cannot send/receive traffic The method 500 may then proceed to block 508 where network data traffic is transmitted on the first FC networking device and the second FC networking device according to the active zone sets in each FC networking device. In an embodiment, at block 508, the FC networking device engine 304 on the FC networking device 208 may transmit network data traffic that conforms with the zones in the zone database 600 in FIG. 8A, while blocking network data traffic that does not conform with the zones in the zone database 600. For example, if the FC networking device engine 304 in the FC networking device 208 receives network data traffic that includes a source identifier that corresponds with the initiator device 202 and a destination identifier that corresponds with the target device 212, then the FC networking device engine 304 in the FC networking device 208 may transmit the network data traffic to the target device 212. Likewise, if the FC networking device engine 304 on the FC networking device 208 receives network data traffic that includes a source identifier that corresponds with the initiator device 202 and a destination identifier that corresponds with the target device 212, then the FC networking device engine 304 in the FC networking device 208 may transmit the network data traffic to the target device 212. However, if the FC networking device engine 304 on the FC networking device 208 receives network data traffic that includes a source identifier that corresponds with the initiator device 202 and a destination identifier that corresponds with the initiator device 204, then the FC networking device engine 304 in the FC networking device 208 may block network data traffic to the initiator device 204 due to no zone existing in the zone database 600 for such a network data traffic transfer.

Figure 8B:
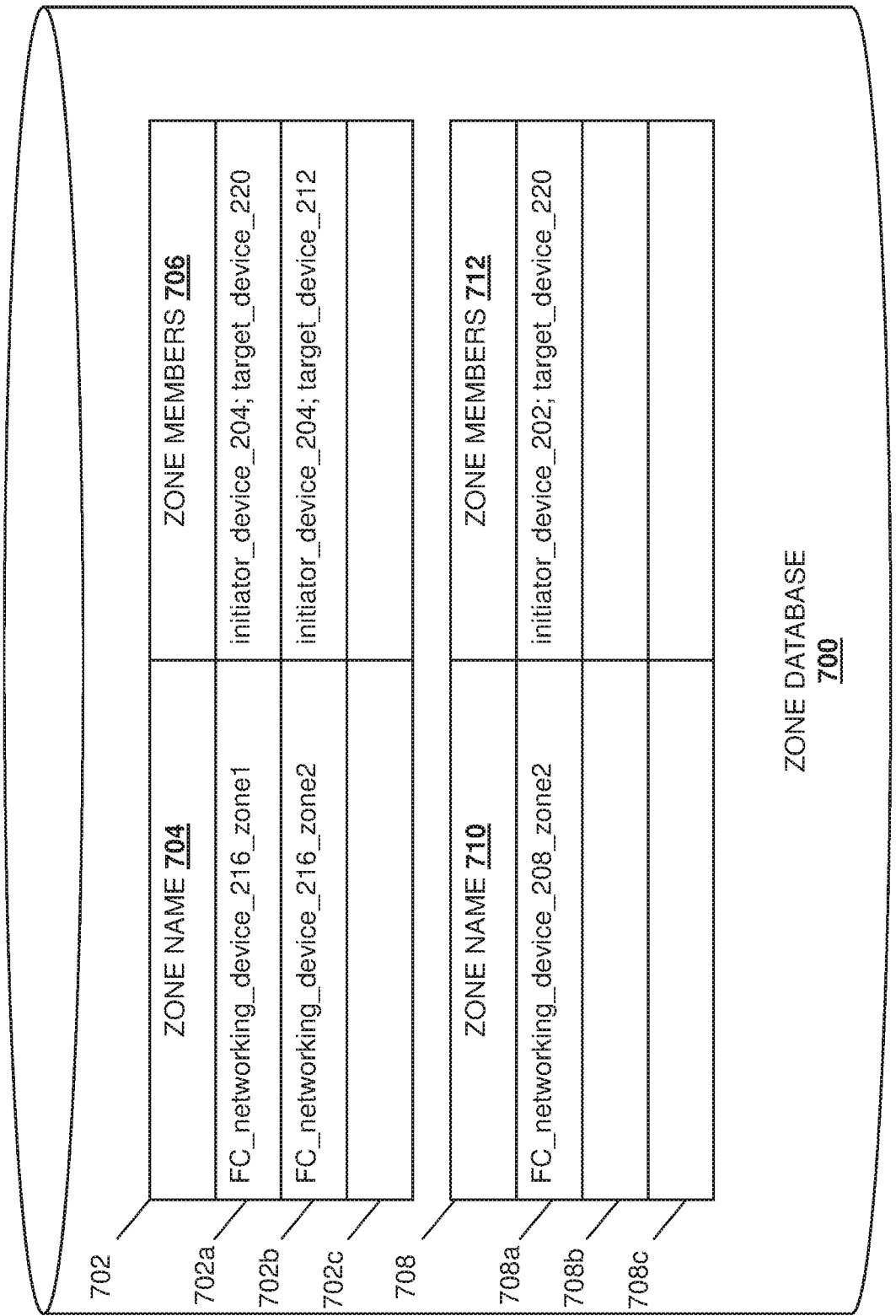
FIG. 8B is a schematic view illustrating an embodiment of information being provided in the zoning database of FIG. 4 during the method of FIG. 5.

Similarly, in an embodiment of block 508, the FC networking device engine 304 in the FC networking device 216 may transmit network data traffic that conforms with the zones in the zone database 700 in FIG. 8B, while blocking network data traffic that does not conform with the zones in the zone database 700. For example, if the FC networking device engine 304 on the FC networking device 216 receives network data traffic that includes a source identifier that corresponds with the initiator device 204 and a destination identifier that corresponds with the target device 220, then the FC networking device engine 304 in the FC networking device 216 may transmit the network data traffic to the target device 220. Likewise, if the FC networking device engine 304 in the FC networking device 216 receives network traffic that includes a source identifier that corresponds with the initiator device 204 and a destination identifier that corresponds with the target device 220, then the FC networking device engine 304 in the FC networking device 216 may transmit the traffic to the target device 220. However, if the FC networking device engine 304 on the FC networking device 216 receives network traffic that includes a source identifier that corresponds with the initiator device 204 and a destination identifier that corresponds with the initiator device 202, then the FC networking device engine 304 in the FC networking device 216 may block traffic to the initiator device 202 due to no zone existing in the zone database 700 for such a network data traffic transfer.

The method 500 may then proceed to decision block 510 where it is determined whether any login changes and/or zone configuration changes have been made in the FC fabric. In an embodiment, at decision block 510, the zone merging engine 304a in the FC networking device 208 may monitor the zoning database 306, the fabric login database 308, and the name server database 310 in the FC networking device 208 for any changes to those databases. Similarly, the zone merging engine 304a in the FC networking device 216 may monitor the zoning database 306, the fabric login database 308, and the name server database 310 in the FC networking device 216 for any changes to those databases. If no changes are detected, the method 500 proceeds back to block 508. However, if changes are detected, the method 500 may proceed back to block 506 where the limited zone merging operations are performed based on the changes. For example, an administrator may add, remove, and/or change a zone in the zone database 600 in the FC networking device 208, which may result in a zone including a non-local zone member that is not local to the FC networking device 208, and the zone merging engine 304a will then operate to provide the zone and its zone members to the FC networking device 216 to be added to the zone database 700 in the FC networking device 216.

In another example, the target device 224 may log in to the FC networking device 216, and the FC networking device 208 may detect that the target device 224 is logged into the FC networking device 216 due to, for example, a name server exchange that updates the name server database 310 on the FC networking device 208. The zone merging engine 304a on the FC networking device 208 may then determine that, because the target device 224 is now not local to the FC networking device 208 and logged in to the FC fabric, a limited zone merging operation should be performed at block 506 due to the zone identified as "FC_networking_device_208_zone 3" including a zone member "target_device_224" that identifies the target device 224. As such, this zone may be merged with the zone database 700 in the FC networking device 216 by transmitting the zone via the link 222 to the FC networking device 216, and the FC networking device 216 updating its FC networking device zone merging table 708 with the received zone. However, in another example, the target device 224 may log in to the FC networking device 208, and the FC networking device 208 may detect that the target device 224 is logged into the FC networking device 208 due to, for example, an update in the name server database 310 on the FC networking device 208 and/or an update in the fabric login database 308. The zone merging engine 304a may then determine that, because the target device 224 is local to the FC networking device 208 and logged in to the FC fabric and the initiator device 202 is also local to the FC networking device 208, no zone merging operation should be performed due to the zone identified as "FC_networking_device_208_zone 3" including only local zone members.

In yet another example, the initiator device 204 may log out of the FC networking device 216 and, in response, the FC networking device 216 will not perform a limited zone merging operation for the zone identified as "FC_neworking_device_216_zone 1" in the zone database 700 because the zone members of that zone are only local zone members and zone members that are not logged into the fabric. In other words, the zone does not include a non-local zone member that is not local to the FC networking device 216. However, if that initiator device 204 logs in to the FC networking device 208, the FC networking device 216 will detect the log in to the FC networking device 208 due to, for example, detecting a change in the name server database 310 in the FC networking device 216. In response, the zone merging engine 304a in the FC networking device 216 may determine that the initiator device 204 is now not local to the FC networking device 216, and the zone merging engine 304a in the FC networking device 216 may perform a limited zone merging operation by transmitting the zone identified as "FC_networking_device_216_zone1" via the link 222 to the FC networking device 208, which causes the FC networking device 208 to update its FC networking device zone merging table 608 with the transferred zone.

Thus, systems and methods have been described that provide for limited zone merging operations between FC networking devices that are coupled together via a link (e.g., an ISL), with those limited zone merging operations decoupled from link initialization operations that are performed when the link is established between the FC networking devices. As such, zones that include a non-local zone member that is not local to an FC networking device may be merged via the link with the other FC networking devices, while zones that include zone members that are only local zone members and/or zone members that are not logged in to the FC fabric are prevented from being merged with other FC networking devices (as those other FC networking devices do not need knowledge of these zones to transmit network traffic.) Thus, the limited zone merging of the present disclosure may be performed after any name server exchanges that update the locality of any device that is coupled to a FC networking device in the FC fabric. Furthermore, when zone conflicts are detected during the limited zone merging operations, traffic may be blocked for the conflicting zones, while the FC networking device that received the conflicting zone may propagate that zone to other FC networking device that can merge that received zone in their own zone databases and operate according to that zone. As such, resources used for zone merging operations and the time required to perform zone merging operations is reduced. Furthermore, less network traffic is affected when zone merging operations identify zone conflicts, as only traffic associated with the conflicted zone is dropped, while other traffic on the link between the FC networking devices that corresponds with other zones that are not conflicting are not affected, as the link may still initialize because of the decoupling of the zone merging operations and link initialization operations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A zone merging system, comprising:
   a Fibre Channel (FC) network that includes:
      a first FC networking device that is associated with one or more first FC networking device zones that are stored in a first zone database in the first FC networking device, wherein each of the one or more first FC networking device zones identifies a plurality of zone member devices that are permitted to communicate with each other; and
      a second FC networking device that is associated with one or more second FC networking device zones that are stored in a second zone database in the second FC networking device, wherein each of the one or more second FC networking device zones identifies a plurality of zone member devices that are permitted to communicate with each other; and wherein the second FC networking device is configured to:
      perform limited zone merging operations subsequent to establishing a link with the first FC networking device that include:
         merging, via the link, each of the one or more second FC networking device zones that are stored in the second zone database in the second FC networking device and that identify at least one zone member device that is not local to the second FC networking device with the one or more first FC networking device zones that are stored in the first zone database in the first FC networking device such that the first FC networking device transmits network data traffic based on the one or more second FC networking device zones merged with the one or more first FC networking device zones in the first zone database; and
         not merging each of the one or more second FC networking device zones that are stored in the second zone database in the second FC networking device and that identify only zone members that are local to the second FC networking device.

2. The system of claim 1, wherein the performing the limited zone merging operations include:
   not merging each of the one or more second FC networking devices zones that are stored in the second zone database in the second FC networking device and that identify only zone members that are local to the second FC networking device and zone members that are not logged in to an FC networking device.

3. The system of claim 1, wherein the performing the limited zone merging operations include:
   not merging each of the one or more second FC networking devices zones that are stored in the second zone database in the second FC networking device and that identify only zone members that are not logged in to an FC networking device.

4. The system of claim 1, wherein the performing the limited zone merging operations include:
   merging, via the link, each of the one or more first FC networking device zones that are stored in the first zone database in the first FC networking device and that identify at least one zone member device that is not local to the first FC networking device with the one or more second FC networking device zones that are stored in the second zone database in the second FC networking device such that the second FC networking device transmits network data traffic based on the one or more first FC networking device zones merged with the one or more second FC networking device zones in the second zone database; and
   not merging each of the one or more first FC networking device zones that are stored in the first zone database in the first FC networking device and that identify only zone members that are local to the first FC networking device.

5. The system of claim 4, wherein the performing the limited zone merging operations include:
   determining, during the merging of each of the one or more first FC networking device zones that are stored in the first zone database in the first FC networking device and that identify at least one zone member device that is not local to the first FC networking device, that there is a conflict with a second FC networking device zone and a conflicted first FC networking device zone; and
   forwarding, to a third FC networking device coupled to the second FC networking device via a second link, the conflicted first FC networking device zone while not merging the conflicted first FC networking zone with the one or more second FC networking device zones.

6. The system of claim 1, wherein the second FC networking device is configured to:
   determine that a zone member device that is identified by one of the one or more second FC networking device zones has logged in to the FC network and, in response, conduct the performing the limited zone merging operations.

7. The system of claim 1, wherein the second FC networking device is configured to:
   initialize a port on the second FC networking device to which the link is connected; and
   perform a name server exchange that indicates whether zone member devices are local or not local to the second FC networking device, wherein the limited zone merging operations are performed subsequent the initializing the port and the performing the name server exchange.

8. An Information Handling System (IHS), comprising:
   a communication system;
   a processing system that includes at least on hardware processor and that is coupled to the communication system; and
   a memory system that includes a non-transitory memory and that is coupled to the processing system and that includes instructions that, when executed by the at least one hardware processor, cause the processing system to provide a zone merging engine that is configured to:
      perform limited zone merging operations subsequent to establishing a link between the communication system and a first FC networking device that include:
         merging, via the link, each of one or more second FC networking device zones that are stored in a second zone database associated with the communication system and that identify at least one zone member device that is not local to the communication system with one or more first FC networking device zones that are stored in a first zone database in the first FC networking device such that the first FC networking device transmits network data traffic based on the one or more second FC networking device zones merged with the one or more first FC networking device zones in the first zone database; and not merging each of the one or more second FC networking device zones that are stored in the second zone database associated with the communication system and that identify only zone members that are local to the communication system.

9. The IHS of claim 8, wherein the performing the limited zone merging operations include:

not merging each of the one or more second FC networking devices zones that are stored in the second zone database associated with the communication system and that identify only zone members that are local to the communication system and zone members that are not logged in to an FC networking device or the communication system.

10. The IHS of claim 8, wherein the performing the limited zone merging operations include:

not merging each of the one or more second FC networking devices zones that are stored in the second zone database associated with the communication system and that identify only zone members that are not logged in to an FC networking device or the communication system.

11. The IHS of claim 8, wherein the performing the limited zone merging operations include:

merging, via the link, each of the one or more first FC networking device zones that are stored in the first zone database in the first FC networking device and that identify at least one zone member device that is not local to the first FC networking device with the one or more second FC networking device zones that are stored in the second zone database associated with the communication system such that network data traffic is transmitted based on the one or more first FC networking device zones merged with the one or more second FC networking device zones in the second zone database, while not merging each of the one or more first FC networking device zones that are stored in the first zone database in the first FC networking device and that identify only zone members that are local to the first FC networking device.

12. The IHS of claim 11, wherein the performing the limited zone merging operations include:

determining, during the merging of each of the one or more first FC networking device zones that are stored in the first zone database in the first FC networking device and that identify at least one zone member device that is not local to the first FC networking device, that there is a conflict with a second FC networking device zone and a conflicted first FC networking device zone; and forwarding, to a third FC networking device coupled to the communication system via a second link, the conflicted first FC networking device zone while not merging the conflicted first FC networking zone with the one or more second FC networking device zones.

13. The IHS of claim 8, wherein the zone merging engine is configured to:

determine that a zone member device that is identified by one of the one or more second FC networking device zones has logged in and, in response, conducting the performing the limited zone merging operations.

14. The IHS of claim 8, wherein the zone merging engine is configured to:

initialize a port on the second FC networking device to which the link is connected; and perform a name server exchange that indicates whether zone member devices are local or not local to the communication system, wherein the limited zone merging operations are performed subsequent the initializing the port and the performing the name server exchange.

15. A method for zone merging, comprising:

performing, by a second FC networking device, limited zone merging operations subsequent to establishing a link between a first FC networking device and the second FC networking device that include:

merging, by the second FC networking device via the link, each of one or more second FC networking device zones that are stored in a second zone database in the second FC networking device and that identify at least one zone member device that is not local to the second FC networking device with one or more first FC networking device zones that are stored in a first zone database in the first FC networking device such that the first FC networking device transmits network data traffic based on the one or more second FC networking device zones merged with the one or more first FC networking device zones in the first zone database, while not merging each of the one or more second FC networking device zones that are stored in the second zone database in the second FC networking device and that identify only zone members that are local to the second FC networking device.

16. The method of claim 15, wherein the performing the limited zone merging operations include:

not merging each of the one or more second FC networking devices zones that are stored in the second zone database in the second FC networking device and that identify only zone members that are local to the second FC networking device and zone members that are not logged in to an FC networking device.

17. The method of claim 15, wherein the performing the limited zone merging operations include:

merging, by the second FC networking device via the link, each of the one or more first FC networking device zones that are stored in the first zone database in the first FC networking device and that identify at least one zone member device that is not local to the first FC networking device with the one or more second FC networking device zones that are stored in the second zone database in the second FC networking device such that the second FC networking device transmits network data traffic based on the one or more first FC networking device zones merged with the one or more second FC networking device zones in the second zone database; and not merging each of the one or more first FC networking device zones that are stored in the first zone database in the first FC networking device and that identify only zone members that are local to the first FC networking device.

18. The method of claim 17, wherein the performing the limited zone merging operations include:

determining, by the second FC networking device during the merging of each of the one or more first FC networking device zones that are stored in the first zone database in the first FC networking device and that identify at least one zone member device that is not local to the first FC networking device, that there is a conflict with a second FC networking device zone and a conflicted first FC networking device zone; and forwarding, by the second FC networking device to a third FC networking device coupled to the second FC networking device via a second link, the conflicted first FC networking device zone while not merging the conflicted first FC networking zone with the one or more second FC networking device zones.

19. The method of claim 15, further comprising:

determining, by the second FC networking device, that a zone member device that is identified by one of the one or more second FC networking device zones has logged in and, in response, conducting the performing the limited zone merging operations.

20. The method of claim 15, further comprising:

initializing, by the second FC networking device, a port on the second FC networking device to which the link is connected; and performing, by the second FC networking device, a name server exchange that indicates whether zone member devices are local or not local to the second FC networking device, wherein the limited zone merging operations are performed subsequent the initializing the port and the performing the name server exchange.

* * * * *